Sept. 25, 1962 L. G. SIMJIAN 3,056,132
DEPOSITORY MACHINE COMBINED WITH IMAGE RECORDING MEANS
Filed March 14, 1960 5 Sheets-Sheet 1

*INVENTOR.*
LUTHER G. SIMJIAN
BY
AGENT.

Sept. 25, 1962 L. G. SIMJIAN 3,056,132
DEPOSITORY MACHINE COMBINED WITH IMAGE RECORDING MEANS
Filed March 14, 1960 5 Sheets-Sheet 2

INVENTOR.
LUTHER G. SIMJIAN
BY
Ervin B. Steinberg
AGENT.

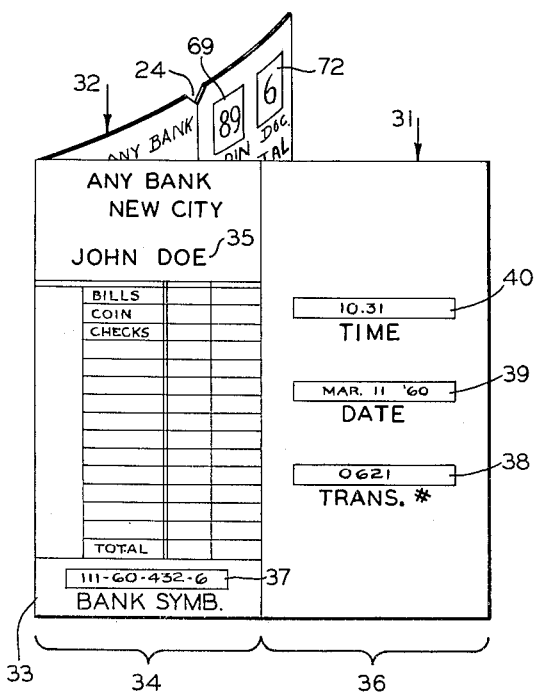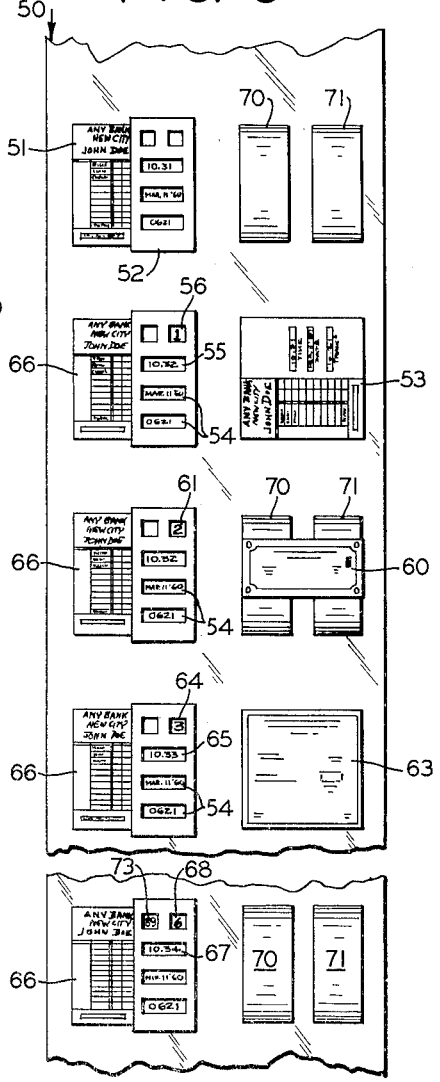

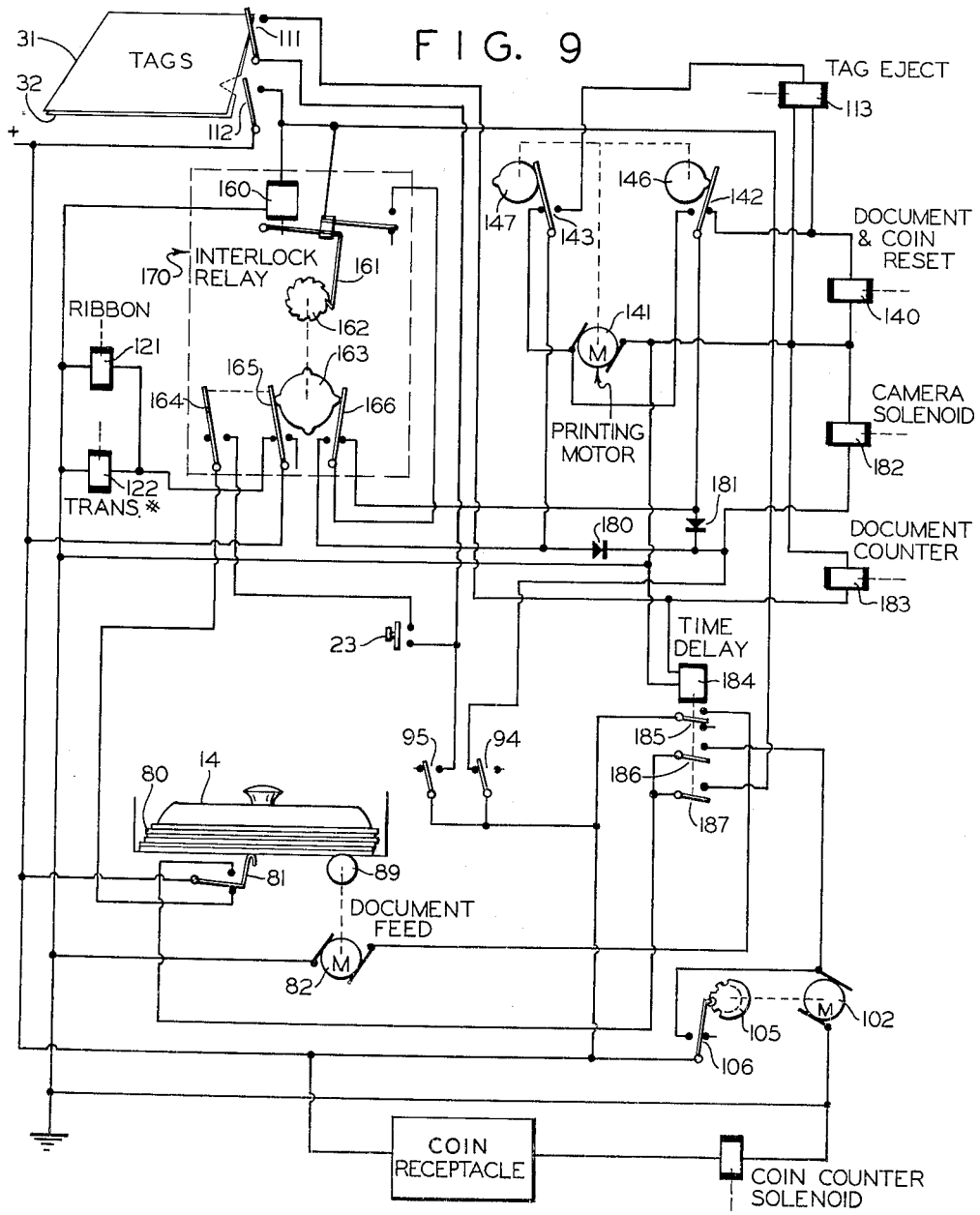

Sept. 25, 1962          L. G. SIMJIAN          3,056,132
DEPOSITORY MACHINE COMBINED WITH IMAGE RECORDING MEANS
Filed March 14, 1960          5 Sheets-Sheet 5
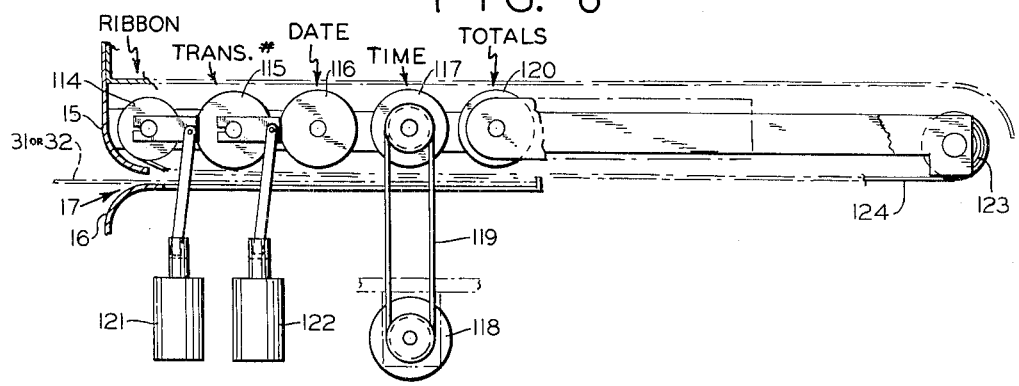
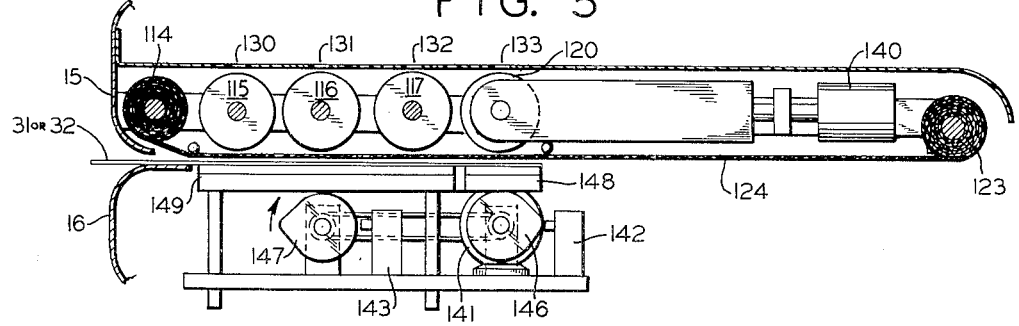
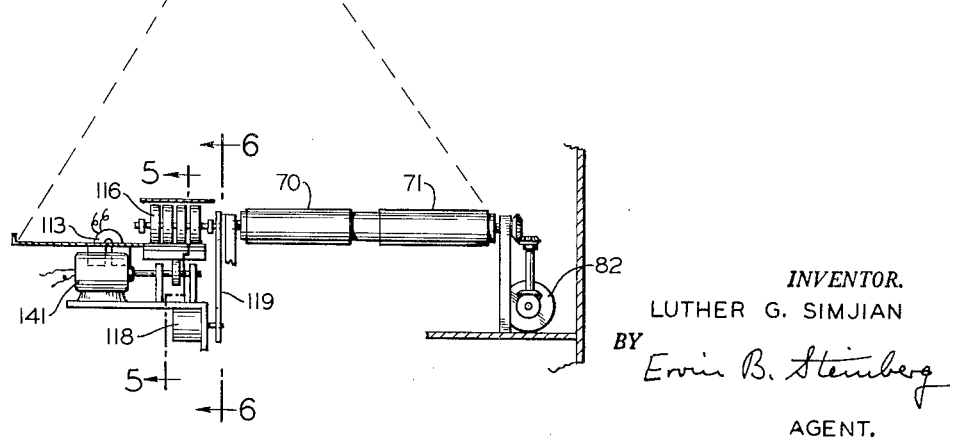
INVENTOR.
LUTHER G. SIMJIAN
BY
Ervin B. Steinberg
AGENT.

United States Patent Office 3,056,132
Patented Sept. 25, 1962

3,056,132
DEPOSITORY MACHINE COMBINED WITH IMAGE RECORDING MEANS
Luther G. Simjian, Greenwich, Conn., assignor to Universal Match Corporation, Ferguson, Mo., a corporation of Delaware
Filed Mar. 14, 1960, Ser. No. 14,736
16 Claims. (Cl. 346—22)

This invention relates to depository machines and has particular reference to a depository machine combined with image recording means suitable for use in banks and other establishments where deposits are accomplished.

More particularly, this invention concerns a depository machine which is provided with validation means in order to validate a depositor prepared receipt. The validation means, the depository apparatus and further display means cooperate with image recording means in such a manner as to render a comprehensive record of the deposit transaction.

The ever increasing activities of banks and similar financial institutions have given rise to the creation of automatic equipment which replaces many of the operations heretofore accomplished manually. As an example, automatic check sorting and computing equipment, designed and developed recently, is now being installed in many banks. Consonant with this automation process, there is the need for automatic deposit receiving equipment which is suited for use by customers. Since the deposit made by customers involves the handling of currency, such as paper bills and coins, checks and other negotiable or non-negotiable instruments, it is important that proper safeguards be provided to assure the existence of sufficient proof in the hands of the customer as well as in the hands of the bank to resolve all discrepancies with utmost dispatch and finality.

The machine described hereinbelow has been designed with particular emphasis on providing unequivocal proof to the bank, as well as to the customer. In order to accomplish this aim, novel validation means have been designed and incorporated in the depository machine, which means are connected to image recording means to produce a documentary record when the machine is operated. Moreover, further recording and display means have been provided to produce a running account of the deposited items which form the deposit. Furthermore, recording is accomplished of such data as for instance, time, total amount and so forth as to create sufficient evidence for all parties concerned and to overcome many psychological reservations that may have existed heretofore.

One of the objects of this invention therefore, is the provision of a new and improved depository machine which avoids one or more of the limitations and disadvantages of prior art devices.

Another object of this invention is the provision of a depository machine combined with validation means and image recording means whereby the action of the validation means is suitably recorded by the image recording means.

Another object of this invention is the provision of a depository machine which validates a deposit tag and provides a documentary record of the tag and of further data pertaining to the deposit.

Still another object of this invention is the provision of a depository machine which provides for the sequential feeding of any quantity of deposit items and which records by means of image recording means, all items of the deposit in associated identifiable relation with an image of data displayed by validation means.

A further object of this invention is the provision of a depository machine combined with validation and image recording means, both means being arranged in such a manner as to produce a timed record of the depositor's action.

These and other objects of the invention are accomplished by providing an arrangement in which a depositor itemizes on a deposit tag the checks, currency and the like which he desires to deposit. This tag in the preferred embodiment, is made out in duplicate and both copies are inserted in a validation means. Upon engagement of the tags by these means, imprinting means which form a part of the validation means are actuated to cause the tags to be validated by imprinting thereon suitable serializing indicia, date, etc. At the same time, image recording means suitably disposed are actuated also to provide a photographic record of the validation indicia together with the tag portion previously filled out by the depositor. Subsequently, a copy of the validated tags and the items of the deposit are fed sequentially from the deposit acceptance means of the machine to storage means. As the various deposit items traverse the distance between the acceptance and storage means, each deposited item is photographed by the image recording means together with an image of identifying data displayed by display means which too are associated with the validation means. When all items of the deposit have been fed to the storage means, a copy of the original validated deposit tag is imprinted again by the validation means, affixing thereto indicia corresponding to totalized quantities. Moreover, the image recording means are actuated in order to provide a final documentary record of the copy of the deposit tag together with the totalized quantities imprinted and displayed respectively.

The novel features that are considered characteristic of the invention are set forth with particularity in the appended claims. The invention itself, both as to its organization and method of operation, as well as additional objects and advantages thereof, will best be understood from the following description when read in conjunction with the accompanying drawings in which:

FIGURE 4 is an elevational view, partly in section, along lines 4—4 in FIGURE 3;

FIGURE 5 is an elevational view, partly in section, along lines 5—5 in FIGURE 4 revealing certain features of the imprinting means;

FIGURE 6 is an elevational view along lines 6—6 in FIGURE 4 revealing further features of the imprinting and display means which form a part of the validation means;

FIGURE 7 is a perspective view of the deposit tags which are employed in conjunction with the present invention;

FIGURE 8 is a plan view of a typical documentary record provided by the image recording means associated with the machine, and FIGURE 9 is a typical schematic electrical circuit diagram showing the interconnection of the various electrical components to render the instant machine operable.

Figure 1:
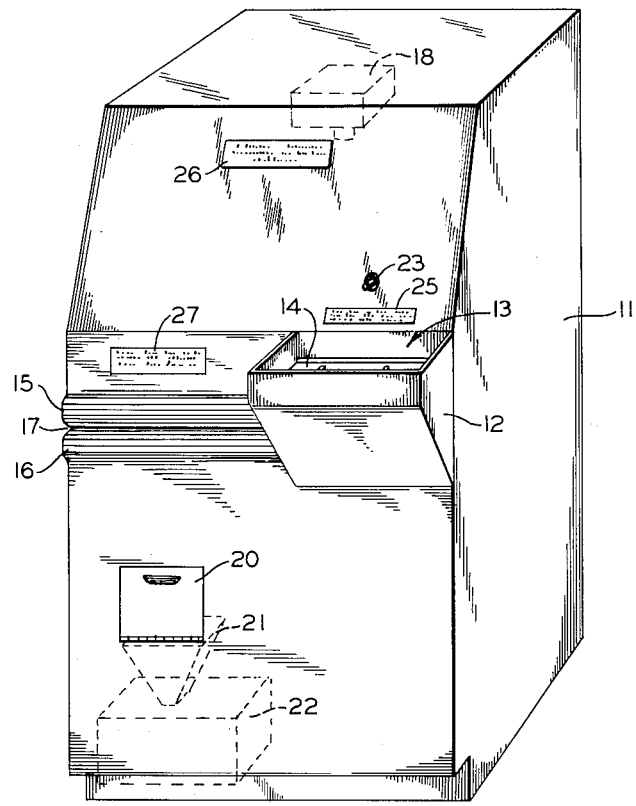
FIGURE 1 is a front view of the depository machine.

Referring now to the figures and FIGURE 1 in particular, numeral 11 identifies an enclosure which houses substantially all of the components of the depository machine described hereafter. A protruding part of the enclosure, numeral 12, provides a hopper 13 from which items forming the deposit are fed into the enclosure. This feeding is accomplished by placing checks, paper bills, etc., in stacked relation into the hopper and weighting them down with a weight 14. Feeding means disposed underneath the bottom plate of the hopper sequentially feed the lowermost items into the enclosure.

Between rounded guides 15 and 16 there is disposed a slot 17 into which deposit tags are inserted for the purpose of validating the tags and rendering the machine operative. This slot, therefore, cooperates with the validation means as will be described later. An image recording means, such as a microfilm camera 18, is disposed near the top of the enclosure and is located to view the items fed into the machine at hopper 13, to view the deposit tag inserted into slot 17 and moreover, to view certain display means which are associated with the validation means. The microfilm camera is of a commercial type and is electrically operated as is well known in the art.

A door 20 leading via a chute 21 to a receptacle 22 serves for the deposit of coin money or other articles which are bulky and therefore, cannot readily be fed through feeding means designed primarily for flat, flexible and stacked articles. It will be understood that door 20 may be constructed in the shape and arrangement of a night depository device. Alternately, in its preferred embodiment door 20 leads to a coin counting mechanism which is adapted to receive such money and simultaneously provides an output signal for an indicia display which is responsive to the totalized amount of such coin money. Such a coin counting and display mechanism is incorporated, for instance, in the "Mail-O-Mat" machine manufactured by Pitney-Bowes, Inc., Stamford, Connecticut, and installed in many U.S. Post Office lobbies. Upon insertion of various coins, the counting mechanism displays the totalized value of the coins deposited. Numeral 23 refers to a control switch for starting the feeding mechanism associated with hopper 13. Numerals 25, 26 and 27 refer to instruction plates suitably mounted, in order to guide a depositor in the use of the instant apparatus.

Referring now to FIGURE 7, a typical deposit tag is shown which is used in conjunction with the instant device. In the preferred embodiment, the deposit tag comprises a first copy, numeral 31, and a second copy 32, both copies being joined severally along edge 33. The front tag 31 may be provided on its reverse side with transfer material in order that information written by a depositor on the front be transferred to copy 32. Alternately, a carbon paper may be interleaved. A depositor will use the left portion 34 of the deposit tag in the usual manner, itemizing the various items of the deposit, particularly itemizing the checks and totalizing the bills and coins in the customary manner. The depositor identifying name and address 35 may be handwritten, or be imprinted by means of an embossed nameplate as have been distributed in conjunctoin with electronic machine accounting methods. The tags may be provided also with a preprinted bank symbol 37. The right-hand portion of the deposit tag 36 is left bank. A notch 24 in the top edge of tag 32 serves for control purposes as will be described later. Particularly, it denotes to a switch that the front tag 31 has been removed.

When the deposit tag has been filled out, both copies, still joined along edge 33, are inserted by the depositor using the machine into slot 17, FIGURE 1, and pushed toward the rear. The deposit tags are now engaged by validation means which imprint validating indicia on the tags and simultaneously display correlated indicia to the image recording means 18, FIGURE 1. Typical information imprinted by the validation device are, for instance, the indicia referring to an assigned transaction number, numeral 38, date 39, and prevailing time 40. The imprinting of these indicia is considered the validation of the deposit tag and comprises the first step. It will be apparent that still further and other validation data and seals may be affixed as desired by the respective banking institution. Simultaneous with the validation of the deposit tag, image recording means 18 are actuated to record an image of the left portion of the deposit tag (filled out by the depositor) and record also correlated displayed indicia which correspond to the indicia imprinted onto the right-hand deposit tag portion 36.

This documentary record is shown on film strip 50, FIGURE 8, which at numeral 51 shows a pictorial record of the tag portion 34 and which at numeral 52 shows a display of indicia which are correlated, preferably identical, to the indicia affixed to portion 36 of the tag. Numerals 70 and 71 to the right of the photograph of the deposit tag refer to a set of feed belts which feed deposited items to the storage receptacle. Since at the first instant only the deposit tag is inserted into the validation means and no article is fed, the feed rollers are empty.

After validation, the deposit tags 31 and 32 are removed from slot 17 and separated by tearing along edge 33. It will be apparent that the depositor holds now a validated tag and that the process of validation is connected with the image recording means in such a way that recorded proof of the validation is available when the depositor possesses a duly validated tag. Next, tag 32 is re-inserted into the slot to maintain the depository machine operative. Tag 31 is placed on the bottom of the stacked items which form the deposit and the deposit is put into hopper 13. Upon actuating switch 23, the feeding means becomes operative. As the first item is fed from the bottom of the stacked deposit, in this case the deposit tag 31, camera 18 is triggered. A documentary record is shown at numeral 53 which shows tag 31 disposed on the feeding belts. This documentary record of tag 31 is associated with a photograph 66 of deposit tag copy 32, this latter copy having been re-inserted into the validation means as described above and resting therein. Also associated with these images are the data imprinted on tags 31 and 32, which data are displayed simultaneously by display means associated with the validation means, i.e., the transaction number and date, numeral 54. The prevailing time display may have advanced to a new time 55. The new time indicia thus would indicate to the bank the time lapse which occurred between validating the deposit tag and feeding the first article of the deposit into the machine. Moreover, counting and display means associated with the feeding means display to the recording means 18, indicia corresponding to the number of articles fed, in this instance showing "1," numeral 56, to indicate that tag 31 is the first item of the deposit fed into the machine. Numeral 60 shows a documentary record of the second item fed into the machine together with the transaction number, date, and time displays toward the left, as previously described. Tag 32 is still disposed in the validation means, hence image 66 is in associated identifiable relationship. It will be observed that the indication of the quantity of deposit items fed has increased to "2" as shown by numeral 61. The photograph of a further deposit item is shown at numeral 63 and the new quantity indication "3" is shown at numeral 64. Meanwhile, the prevailing time indication may have increased to a new value 65. When all items of the deposit have been fed into the machine, the feed rollers are empty again and the display means associated with the validation means display then indicia indicating the total quantity of items fed in this deposit and the total of the coin deposit is available if the depositor has effected such a deposit. At this time, the validating means are actuated to imprint on tag 32 the indicia corresponding to these latter values and simultaneously, the image recording means are triggered to record an image of correlated indicia. The total quantity of items or documents fed is imprinted on tag 32, numeral 72, FIGURE 7, and an image thereof is visible on the film 50 numeral 68. Similarly, numeral 69 refers to the imprinted total of the coins, while numeral 73 is an image of the displayed indicia. By this time the prevailing time may have advanced to a new value 67, however, the transaction number and date remained the same. The imprinting of tag 32 with these totalized data causes zeroizing of all indicia printing and display means which need to be reset for acceptance of a new deposit and the transaction number is advanced. Obviously, the date and time imprinting and display means are not zeroized at this time. Although the values associated with reference numerals 69 and 72 are depicted in FIGURE 7 in conjunction with a representation of tag 31 and the latter still being shown as attached to tag 32, it will be recalled from the previous description that at the time of printing and recording of these totalized data, tag 31 is actually separated from tag 32, tag 31 having been deposited previously in the machine and tag 32 being at this instant engaged by the validating means.

Upon removal of tag 32 from slot 17, the depositor holds a validated receipt which exhibits the depositor filled information on portion 34 and the imprinted validation data, specifically, transaction number, date, starting time of the deposit, totalized quantities of documents fed and coin money deposited on portion 36.

Referring to the film strip depicted in FIGURE 8, it will be apparent that there is available to the bank a complete record of the deposited documents, a record of the deposit tag and of such transaction numbers and time information as will clearly reveal the action of the depositor. For instance, the time consumed, the order of sequential feeding of the articles, transaction number, date and time associated with each item of the deposit are readily established. Moreover, the film depicts depositor identifying data, i.e. name, address, intended deposit, etc., in associated relationship with each item of the deposit.

The document feeding, indicia imprinting and display means are shown more clearly in the following figures. Referring to FIGURE 3, documents 80, such as paper bills and checks, are disposed in hopper 13 and weighted down by weight 14. An actuating arm associated with switch 81, by means of an aperture 93 in the bottom plate (FIGURE 2) of the hopper senses the presence of documents to be fed. Feed motor 82 drives shaft 83 which has fastened thereto bevel gears 84 and 85. These bevel gears engage mating gears to drive vertical shafts 86 and 87 which in turn, operate rollers 88 and 89. Feed roller 89 protrudes with its upper peripheral surface through an aperture in the bottom plate of the hopper to engage the lowermost article. This article then is fed through a slotted aperture in the front wall of the hopper and machine enclosure toward feed roller 88 which is opposed by a resilient pressure roller 90, the latter being suspended from bracket 91.

Figure 2:
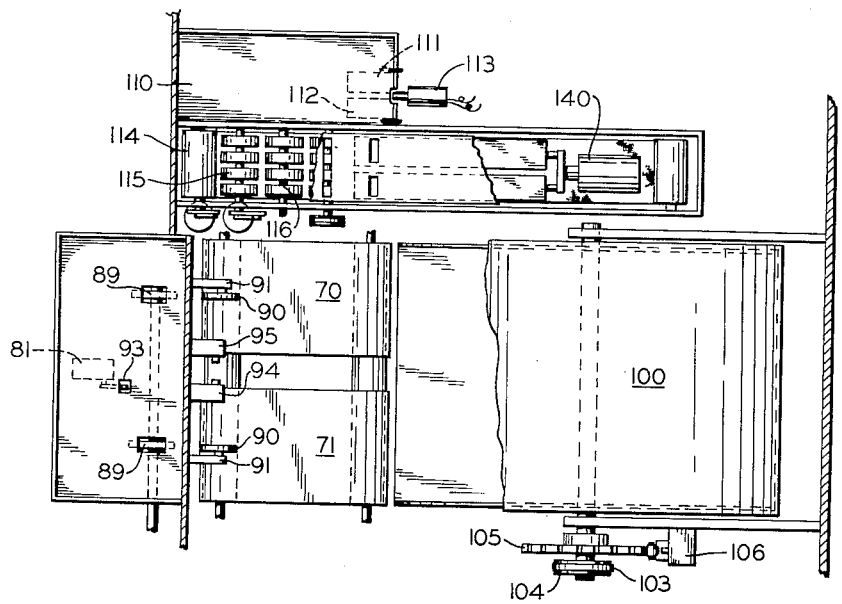
FIGURE 2 is a top plan view, partly in section, of the feeding and validation means.
Figure 3:
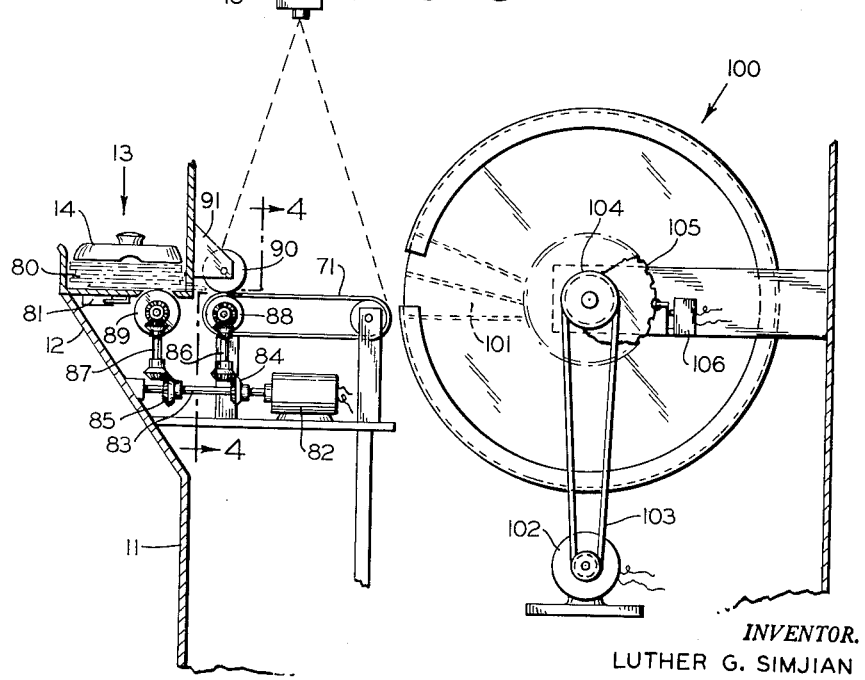
FIGURE 3 is an elevational view, partly in section, showing the feeding and deposit receiving means together with the image recording means.

Referring to FIGURE 2, it will be observed that there are two belts 70 and 71 for receiving the documents from the hopper whereas one belt would suffice. This plurality of belts has been provided in order to create a central space for disposing sensing switches 94 and 95, both sensing the feeding of documents. One switch is utilized for actuating the image recording means 18 when a document is disposed on the feed belts and the other switch retains feed motor 82 operating as long as documents are being fed. The gearing between rollers 89 and 88 is such that rollers 88 feed the documents slightly faster than rollers 89. The individual rollers and necessary shafts are duplicated for the respective feed bolts. The general arrangement and construction of this type of feeding mechanism is quite well known in the art of record machines and will readily be understood by those skilled in the art.

Image recording means 18 is so disposed that documents located on feed belts 70 and 71 are in view of the recording means. From the feed belts the documents are advanced toward the right into a storage receptacle 100 which is provided with a plurality of compartmentized pockets 101. A partial enclosure surrounding the receptacle provides an aperture at the end which faces the feed belt in order to enable access to one pocket. Motor 102 via belt 103 and pulley 104 fastened to receptacle 100, serves to advance the receptacle to cause each deposit to become confined to one pocket and to be retained therein separately from a succeeding deposit. A notched cam 105 mounted to the receptacle and cooperating with switch 106 causes suitable indexing of the receptacle and controls the step by step advance of the receptacle. A receptacle of this drum type as well as other compartmentized receptacles have been described in my copending application for U.S. Letters Patent, entitled "Depositing Machine Combined With Camera Means," Serial No. 693,986, filed November 1, 1957, now Patent No. 2,936,684, issued May 17, 1960.

In FIGURE 2, the area identified by numeral 110 denotes that portion of the validating means from which portion 34 of tags 31 or 32 will be visible to the image recording means 18. Switch 111 is actuated when both tags are disposed in the validating means, whereas switch 112 senses the presence of notch 24 in tag 32 and thus remains not actuated when tag 32 is re-inserted, tag 31 having been severed from tag 32. Solenoid 113 mounted to the rear serves to eject the deposit tag at the completion of the cycle.

Numeral 114 is an inked or carbon paper ribbon advance roller, while numerals 115 and 116 in FIGURE 2 point to imprinting and indicia display wheels. These wheels are commercial wheels used for simultaneous printing and display. In their basic configuration, the circumference of each wheel is embossed with indicia for printing purposes and an identical indicia display is located at 180 degrees opposite to the embossed printing indicia. This construction thus permits the imprinting of an indicia and the simultaneous display of the equivalent indicia. Wheels of this type are available, for instance, from the Durant Manufacturing Co., Milwaukee, Wisconsin. It will be understood, therefore, that tag portion 36 disposed underneath wheels 115, 116, etc., can be imprinted with suitable indicia while at the same time the corresponding indicia can be viewed by the image recording means 18 disposed thereabove. When printing variable numerals there is provided, of course, one wheel for each digit.

The arrangement of the indicia printing and display wheels is shown more clearly in FIGURES 4 through 6. Numeral 123 identifies a supply roller for carbon paper or ribbon 124 which is wound on roller 114. The advance of this paper is controlled by a pulsing solenoid 121. The transaction number is governed by the setting of printing and display wheels 115, the advance of this serializing number being controlled by a pulsing solenoid 122. The date printing and display wheels 116 as shown herein are manually controlled. They may be set at the end of a business day or at the start of a new day. Indicia wheels 117 are driven by a synchronous clock motor 118 via belt 119 and thus, at all times print and display respectively the prevailing time. Numeral 120 refers to the totalized printing and display wheels for the coin counting and document counting means respectively, both being zeroized by a solenoid 140. The incremental setting of the totalizing means is controlled by pulsing solenoids as are well known in the art, particularly with reference to the device mentioned heretofore. Apertures 130, 131, 132 and 133 disposed in the cover above the printing and display wheels 115, 116, 117 and 120 permit image recording means 18 to view the indicia display, which indicia, as explained heretofore, correspond to the indicia positioned for imprinting onto the tags 31 and 32.

The printing of the tags by means of the embossed indicia is shown with reference to FIGURES 5 and 6. A motor 141 is coupled through suitable means to drive two cams 146 and 147 respectively. Each cam is provided with a peripherally extending portion. Motor 141 is cycled in such a manner that during its rotation, each cam revolves by 180 degrees and then stops. The extending peripheral portion of cam 146 is shown to be in contact with a stationary switch 142. The extending portion of cam 147 is adapted to engage switch 143 but, as shown in FIGURE 5, it is not in contact with this switch at the instant depicted. Cam 146 is in contact with a movable printing platen 148 and cam 147 is engaged by a movable printing platen 149, both platens being capable of selective momentary vertical motion responsive to the rotation of the associated cam. Upon energizing motor 141, cams 146 and 147 are caused to rotate in unison in clockwise direction by 180 degrees, stopping of the cams being effected when cam 147 actuates switch 143. Cam 146 now is no longer in contact with switch 142. During rotation of both cams platen 149 is momentarily raised and lowered thereby causing transaction number wheels 115, date wheels 116 and time wheels 117 to transfer their respective indicia onto tags 31 and 32. This operation corresponds to the first imprinting operation when both tags are being imprinted, that is validated, with the aforesaid data.

As described previously, tag 31 then is separated from tag 32, and tag 32 is re-inserted into the validating means. Later, near the end of the deposit cycle, motor 141 is actuated again and both cams, 147 and 146, are caused to rotate in clockwise direction a further 180 degrees. During this operation, cam 147 leaves switch 143 and returns to the position shown in FIGURE 5, whereas cam 146, formerly having its protruding peripheral portion facing toward the left, momentarily raises platen 148 and subsequently stops the motor when switch 142 is actuated. Raising of platen 148 causes the totalized value corresponding to the quantity of items fed by the feeding means and the totalized value corresponding to the coins accepted at door 20 to be transferred to the tag copy 32.

During a succeeding operation it will be observed, that only data from printing wheels 115, 116 and 117 are imprinted onto a new set of deposit tags. As has been noted previously, the image recording means 18 are actuated substantially simultaneously with the transfer of indicia from the wheels to the tags in order that a recorded image of the printed data be available.

*Circuit Diagram, FIGURE 9*

A set of tags, with information completed by the depositor, but not separated along edge 33, is placed in the machine via aperture 17, FIGURE 1, and moved to the rear manually until switches 111 and 112 are operated. Switch 111 has no function at this time and switch 112 energizes interlock relay 170 by energizing coil 160 which forms a part thereof. This type of relay operates so that its contacts remain in the last operated condition even after the relay coil is de-energized. As armature 161 moves toward coil 160, the armature indexes toothed wheel 162 one-eighth revolution, causing coupled cam 163 to rotate by a corresponding amount. Cam 163 has protrusions every one-fourth revolution, thus contacts 164, 165 and 166 are operated every other cycle, that is, the contacts will return to the position shown after two consecutive operations of armature 161.

As coil 160 is actuated, contacts 164 and 165 perform no function at this time, but contact 166 energizes motor 141 via switch 143, as well as operating the camera solenoid 182. When cam 147 rotates, it first moves printing platen 149, FIGURE 5, thus stamping the time, date and transaction number as shown on tag 31, FIGURE 7. Further rotation of cam 147 operates switch 143, stopping driving motor 141 and energizing solenoid 113 which ejects both tags from the validation means. Cam 146 rotated one-half revolution operating associated switch 142, but rectifier 181 prevents the voltage from switch contact 166 to reach switch 142. Thus, tags 31 and 32, FIGURE 7, have been imprinted with validation information and the recording means were actuated to record the respective portions 51 and 52 on film, FIGURE 8.

The tags now are removed from the validation device and both tags separated from each other. The front tag is placed at the bottom of the stack of deposits and the duplicate copy is re-inserted into aperture 17. Notched portion 24 does not operate switch 112 and only switch 111 is actuated. With a stack of deposits in hopper 13, FIGURE 1, switch 81 is actuated and with switch 111 operated by tag 32, a circuit is completed to time delay relay 184 when start switch 23 is depressed momentarily by the depositor. This relay operates in a normal manner but delays on drop out after the coil voltage is removed. Associated contact 185 of relay 184 causes motor 82 to run, thus via roller 89 advancing documents 80 out of the hopper onto the belts and toward the storage receptacle 100. As the documents advance on the feed belts, their leading edges operate switches 94 and 95. Switch 95 applies via closed switch 111 a pulse to time delay relay 184 for each document thus keeping the relay energized and at the same time pulse document counter solenoid 183. This causes the number indicative of the quantity of fed documents to be indexed for printing and recording purposes as shown at reference numbers 56, 61, 64 and 68, FIGURE 8. Switch 94 triggers the camera solenoid 182 for each document passed, thus operating the camera and recording each document together with its associated indicia as shown by reference numerals 53 and 56, 60 and 61, etc., in FIGURE 8.

When the hopper is empty, switch 81 returns to its normal position, thus applying a voltage to contact 186 and contact 187 of time delay relay 184. Contact 186 starts motor 102 which indexes the storage receptacle 100 via cam 105 and switch 106 so as to store the deposit and expose an empty pocket for a succeeding deposit. Contact 187 operates the interlock relay 170 which returns the associated contact arms to normal (as shown), thus, advancing the transaction number via contact 165 and solenoid 122, advancing also the ribbon via solenoid 121, operating the camera solenoid 182 via switch 166 and starting motor 141 via switches 166 and 142. Cam 146 makes one-half revolution, first moving platen 148 upward and then opening switch 142 which stops motor 141 and energizes the tag eject solenoid 113. Also the document and coin reset solenoid 140 is actuated. Cam 147 rotated one-half revolution allows switch 143 to return to normal (as shown) but rectifier 180 prevents the voltage from switch 166 from reaching switch 143. Coins fed to the coin receptacle energize the coin counter solenoid which in turn indexes the respective wheels. Hence, the last record on the film will show the amount of the coin deposit at numeral 73, FIGURE 8.

This completes the cycle for one deposit which comprises a plurality of documents and coins.

While the above description and illustrations in a general sense, refer to a preferred embodiment of the invention, it will be apparent that several modifications and changes may be made without departing from the inventive concept. For example, instead of providing a pair of juxtaposed deposit tags with transfer material therebetween, it will be possible to use two validation means, disposed side by side, and synchronized with respect to one another in order to imprint the desired data on separated deposit tags. Moreover, instead of using wheels which operate simultaneously as printing display means, separate display devices may be substituted which are operatively connected to the printing and/or sensing means. Such display means may be operated mechanically, electrically, optically or may comprise electronic display tubes as are well known in the art. Still further, the display means as well as the imprinting means not necessarily form a part of the enclosure 11, but may be disposed outside the enclosure, images thereof being rendered visible to the image recording means by the use of light deflecting means or image repeating instrumentalities. In a still further embodiment, it will be apparent that the microfilm camera can be replaced by other image recording means including photographic or electromagnetic recording means and such other recording devices as are well known to persons skilled in the art.

A further modification readily accomplished, involves the substitution of photoelectric sensing means for the mechanically actuated switch used for the deposit item sensing and counting mechanism.

Although in its preferred embodiment the instant machine is operated in conjunction with dual deposit tags as has been described and illustrated in the respective figures, a single tag validated by the validating means and subsequently retained by the depositor may suffice in many instances. Since the validation of the tag is the first step in the operation of the machine and as the tag itself together with validation data forms the first documentary record provided by the image recording means, succeeding images of deposit items can be related to the preceding tag image. The depositor, in this method, holds a machine-validated tag which is presented to the bank, can be identified on the film strip and any succeeding action or omission thereof by the depositor is readily determined. Unless the depositor has deposited other identifying means, the bank will have to develop the film in order to ascertain the depositor or account since only a single tag, held by the depositor, is in existence.

While there have been described and illustrated certain embodiments of the present invention and specific alternate constructions thereof, it will be apparent that still further vairations and modifications may be made therein without deviating from the principle and intent of the present invention, which should be limited only by the scope of the appended claims.

What is claimed is:

1. In a depository machine of the type described which machine includes validation means, image recording means, and article feed means, the latter being adapted to accept a deposit and when operative feeding the deposit from an acceptance position to storage means, the combination of: validation means adapted to engage a deposit tag and cause validation thereof by affixing to the tag validation indicia; image recording means disposed to view said tag when the tag is engaged by said validation means; said image recording means disposed also to view a deposit supplied to the deposit acceptance position and fed therefrom to the storage means; control means causing a first operation of said recording means when the tag is engaged by said validation means whereby to produce a recorded image of the tag; control means actuating also said image recording means to record an image of said deposit as the deposit is fed from the acceptance position to the storage means, and means coacting with said validation means to cause said deposit feed means to be inoperative while said tag is being validated and to be rendered operative subsequent to the actuation of the validation means and said first operation of said image recording means.

2. In a depository machine of the type described which machine includes validation means, image recording means, and article feed means, the latter being adapted to accept a deposit and when operative feeding the deposit from an acceptance position to a storage position, the combination of: validation means adapted to engage a deposit tag and cause validation thereof by affixing to the tag validation indicia; image recording means disposed to view said tag when the tag is engaged by said validation means; said image recording means disposed also to view a deposit supplied to the deposit acceptance position and fed therefrom to the storage position; control means causing a first operation of said recording means when the tag is engaged by said validation means whereby to produce a recorded image of the tag; control means actuating also said image recording means to record an image of said deposit as the deposit is fed from the acceptance position to the storage position, and means coacting with said validation means to cause said deposit feed means to be inoperative until after the tag has been validated by said validation means and removed from operative engagement therewith.

3. In a depository machine of the type described which machine includes validation means, image recording means, and article feed means, the latter being adapted to accept a deposit and when operative feeding the deposit from an acceptance position to a storage position, the combination of: validation means adapted to engage a deposit tag and cause validation thereof by affixing to the tag validation indicia; image recording means disposed to view said tag when the tag is engaged by said validation means; said image recording means disposed also to view a deposit supplied to the deposit acceptance position and fed therefrom to the storage position; control means causing a first operation of said recording means when the tag is engaged by said validation means whereby to produce a recorded image of the tag; control means actuating also said image recording means to record an image of said deposit as the deposit is fed from the acceptance position to the storage position, and means on said deposit tag coacting with said validation means to cause said deposit feed means to be inoperative until after the tag has been validated by said validation means and removed from operative engagement therewith.

4. In a depository machine of the type described which machine includes validation means, image recording means, and article feed means, the latter being adapted to accept a deposit and when operative feeding the deposit from an acceptance position to storage means, the combination of: validation means having indicia display and printing means and being adapted to engage a deposit tag to cause when actuated validation of an engaged deposit tag by affixing thereupon indicia while simultaneously displaying correlated indicia; image recording means disposed to view said tag when the tag is engaged by said validation means, the indicia displayed by said display means, and a deposit supplied to the deposit acceptance position and fed therefrom to the storage means; control means causing actuation of the validation means and a first operation of said recording means when the tag is engaged by said validation means whereby to produce a recorded image of the tag and of the displayed indicia which are correlated with the indicia affixed to the deposit tag; control means actuating also said image recording means to record an image of said deposit as a deposit is fed from the acceptance position to the storage means, and means coacting with said validation means for causing said deposit feed means to be inoperative while said tag is being validated and rendering said feed means operative subsequent to the actuation of the validation means and said first operation of said image recording means.

5. In a depository machine as set forth in claim 4 wherein the indicia displayed by the validation means and the indicia affixed by the validation means to the deposit tag are in substantially superposed relationship with one another along a viewing axis substantially perpendicular to the plane of the deposit tag.

6. In a depository machine of the type described which machine includes validation means, image recording means, and article feed means, the latter being adapted to accept a deposit and when operative feeding the deposit from an acceptance position to storage means, the combination of: validation means having indicia display and printing means and being adapted to engage a portion of a deposit tag to cause when actuated validation of the partially engaged deposit tag by affixing indicia to the engaged portion while simultaneously displaying correlated indicia; said deposit tag being constructed to exhibit deposit identifying data on the not-engaged tag portion; image recording means disposed to view the not-engaged portion of the tag when the tag is engaged by said validation means, the indicia displayed by said display means, and a deposit supplied to the deposit acceptance position and fed therefrom to the storage means; control means causing actuation of the validation means and a first operation of said recording means when the tag is engaged by said validation means whereby to produce a recorded image of the not-engaged portion of the tag and of the displayed indicia which are correlated with the indicia affixed to the deposit tag; control means actuating also said image recording means to record an image of said deposit as a deposit is fed from the acceptance position to the storage means, and control means for causing said deposit feed means to be inoperative while said tag is being validated and rendering said feed means operative subsequent to the actuation of the validation means and said first operation of said image recording means.

7. In a depository machine of the type described which machine includes validation means, image recording means, and article feed means, the latter being adapted to accept a deposit and when operative feeding the deposit from an acceptance position to a storage position, the combination of: validation means adapted to engage a first and a second deposit tag and cause validation thereof by affixing to the tags validation indicia; image recording means disposed to view at least one of said tags when the tags are engaged by said validation means; said image recording means disposed also to view a deposit supplied to the deposit acceptance position and fed therefrom to the storage position; control means causing a first operation of said recording means when the tags are engaged by said validation means whereby to produce a recorded image of said one tag; control means actuating also said image recording means to record an image of the deposit as a deposit is fed from the acceptance position to the storage position; means coacting with said validation means to cause said deposit feed means to be inoperative until after said one tag has been validated by said validation means and removed from operative engagement therewith, and to be operative when the other tag remains disposed in operative engagement with the validation means, whereby succeeding operation of said image recording means as a deposit is fed to the storage position produces a recorded image of the deposit and of the second deposit tag disposed in engagement with the validation means.

8. In a depository machine of the type described which machine includes validation means, image recording means, and means for accepting a deposit comprising a plurality of articles which are fed sequentially from a deposit acceptance means to storage means, the combination of: validation means having a serializing indicia display and associated printing means; said validation means adapted to engage a portion of a deposit tag and causing when actuated validation by affixing serializing indicia to the engaged portion while simultaneously displaying correlated serializing indicia; said deposit tag being constructed to exhibit deposit identifying data on the not-engaged tag portion; image recording means disposed to view the not-engaged portion of the tag when the latter is engaged by said validation means; said recording means adapted to view also the indicia displayed by said display and the individual articles of the deposit fed from the acceptance means to the storage means; means sequentially feeding each article from the deposit acceptance means to storage means; control means causing actuation of the validation means and a first operation of said recording means when the tag is engaged by said validation means whereby to produce a first recorded image of the not-engaged portion of the tag and of the displayed serializing indicia which are correlated with the indicia affixed by said validation means to the deposit tag; control means actuating also said image recording means to provide further recorded images of each article of the deposit as each article is fed from the acceptance means to the storage means whereby to produce an image of each article and of the data displayed by the validation means in associated identifiable relationship, and further control means for causing said deposit feed means to be inoperative while said tag is being validated and causing said feed means to be operative subsequent to the actuation of the validation means and the first operation of said image recording means.

9. In a depository machine of the type described and set forth in claim 8 wherein said display means displays also data indicative of the date and time.

10. In a depository machine of the type described and set forth in claim 9, sensing means cooperating with said article feed means to effect a count of the quantity of articles forming the deposit fed to the storage means and said displaying means display indicia responsive to the counted quantity.

11. In a depository machine of the type described and set forth in claim 8 wherein said display means displays also data indicative of the date and wherein means cause a change of the serializing indicia provided by validation means every time a first recorded image is provided.

12. In a depository machine of the type described which machine includes validation means, image recording means, and means for accepting a deposit comprising a plurality of articles which are fed sequentially from a deposit acceptance means to storage means, the combination of: validation means having a serializing indicia display and associated printing means; said validation means adapted to engage respective portions of a first and a second deposit tag and causing when actuated validation by affixing serializing indicia to the engaged portions of said deposit tags while simultaneously displaying correlated serializing indicia; said deposit tags being constructed to exhibit deposit identifying data on the not-engaged tag portions; image recording means disposed to view at least one of the respective not-engaged portions of the tags when the tags are engaged by said validation means; said recording means adapted to view also the indicia displayed by said display and the individual articles of the deposit fed from the acceptance means to the storage means; means sequentially feeding each article from the deposit acceptance means to storage means; control means causing actuation of the validation means and a first operation of said recording means when the tags are engaged by said validation means whereby to produce a first recorded image of the not-engaged portion of the first tag and of the displayed serializing indicia which are correlated with the indicia affixed by said validation means to the deposit tag; control means actuating also said image recording means to record further images of each article of the deposit as each article is fed from the acceptance means to the storage means, and further control means for causing said feed means to be inoperative until after said first tag has been validated by said validation means and removed from operative engagement therewith, and to be operative when the second tag remains in operative engagement with the validation means, whereby said further recorded images show correlated with one another an image of each article of the deposit, of the data displayed by the validation means, and of the not-engaged portion of the second deposit tag.

13. In a depository machine of the type described and set forth in claim 12 wherein said display means displays also data indicative of the prevailing date and time.

14. In a depository machine of the type described and set forth in claim 12, sensing means cooperating with said article feed means to effect a count of the quantity of articles forming the deposit fed to the storage means and said displaying means display indicia responsive to the counted quantity.

15. In a depository machine of the type described and set forth in claim 12 wherein said display means displays also data indicative of the date and wherein means cause a change of the serializing indicia provided by said validation means every time a first recorded image is provided.

16. In a depository machine of the type described and set forth in claim 12 wherein coin totalizing means are provided and the display means displays data indicative of the output from the coin totalizing means.

References Cited in the file of this patent

UNITED STATES PATENTS

| | | |
|---|---|---|
| 1,094,073 | Ilg | Apr. 21, 1914 |
| 1,801,458 | Satterlee | Apr. 21, 1931 |
| 2,717,069 | Driscoll | Sept. 6, 1955 |
| 2,923,587 | Zipf | Feb. 2, 1960 |